United States Patent
Lacher

(10) Patent No.: US 12,510,086 B2
(45) Date of Patent: Dec. 30, 2025

(54) MAGNETIC COUPLING BETWEEN POWER TOOL MOTOR SHAFT AND FAN WHEEL

(71) Applicant: Hilti Aktiengesellschaft, Schaan (LI)

(72) Inventor: Michael Lacher, Schwabmuenchen (DE)

(73) Assignee: Hilti Aktiengesellschaft, Schaan (LI)

( * ) Notice: Subject to any disclaimer, the term of this patent is extended or adjusted under 35 U.S.C. 154(b) by 126 days.

(21) Appl. No.: 18/281,601

(22) PCT Filed: Mar. 11, 2022

(86) PCT No.: PCT/EP2022/056286
§ 371 (c)(1),
(2) Date: Sep. 12, 2023

(87) PCT Pub. No.: WO2022/200073
PCT Pub. Date: Sep. 29, 2022

(65) Prior Publication Data
US 2024/0159239 A1 May 16, 2024

(30) Foreign Application Priority Data
Mar. 26, 2021 (EP) .................................... 21165184

(51) Int. Cl.
*F04D 25/02* (2006.01)
*H02K 49/10* (2006.01)

(52) U.S. Cl.
CPC ......... *F04D 25/026* (2013.01); *H02K 49/108* (2013.01)

(58) Field of Classification Search
CPC ... F04D 25/026; H02K 49/046; H02K 49/108
See application file for complete search history.

(56) References Cited

U.S. PATENT DOCUMENTS 2,711,306 A * 6/1955 Levi ...................... B01F 33/453
310/104
5,947,248 A * 9/1999 Link ...................... F01P 7/081
192/84.1

(Continued)

FOREIGN PATENT DOCUMENTS

CH 664242 A5 2/1988
DE 1112782 B * 8/1961

(Continued)

OTHER PUBLICATIONS

English Machine Translation of DE-2659482-A1 (Year: 1978).*
International Search Report of PCT/EP2022/056286 dated May 27, 2022.

Primary Examiner — Nathan C Zollinger
(74) Attorney, Agent, or Firm — Davidson Kappel LLC

(57) ABSTRACT

A power tool is provided having a motor and a motor shaft, wherein a fan wheel in the power tool is designed to generate an air flow for cooling the motor. The power tool provides a coupling formed magnetically between the fan wheel and the motor shaft such that the motor shaft drives the fan wheel in a rotary movement with a speed that is less than a speed of the motor shaft. As a result of the magnetic coupling of the fan wheel and motor shaft, the movements of the two components can be decoupled from one another such that an increase in the rotational speed of the motor shaft does not also result in an increased speed at the fan wheel. As a result, fan losses can be considerably reduced and the efficiency of the motor of the power tool can be significantly improved. A method is also provided for cooling a motor of a power tool, wherein there is a magnetic coupling between a fan wheel and a motor shaft of the power tool.

15 Claims, 4 Drawing Sheets

(56) References Cited

U.S. PATENT DOCUMENTS

| | | | | |
|---|---|---|---|---|
| 6,129,193 | A | * | 10/2000 | Link .................. F01P 7/081 |
| | | | | 192/84.1 |
| 9,065,320 | B2 | * | 6/2015 | Liang ................ H02K 49/102 |
| 2004/0118656 | A1 | | 6/2004 | Inoue et al. |
| 2013/0094981 | A1 | * | 4/2013 | Liang .................... H02K 7/11 |
| | | | | 310/105 |

FOREIGN PATENT DOCUMENTS

| | | | | |
|---|---|---|---|---|
| DE | 2659482 A1 | * | 7/1978 | |
| DE | 4229038 A1 | * | 1/1994 | ........... F04D 25/026 |
| DE | 10355378 A1 | | 6/2004 | |
| EP | 3598613 A1 | | 1/2020 | |
| FR | 2819119 A1 | | 7/2002 | |
| GB | 523926 A | * | 7/1940 | ............... H02K 9/04 |
| GB | 617060 A | * | 2/1949 | ........... H02K 49/046 |
| GB | 2102216 B | | 4/1985 | |
| WO | WO-2024148115 A1 | * | 7/2024 | ........... H02K 49/108 |

* cited by examiner

MAGNETIC COUPLING BETWEEN POWER TOOL MOTOR SHAFT AND FAN WHEEL

The present invention relates to a power tool having a motor and a motor shaft, wherein a fan wheel in the power tool is designed to generate an air flow for cooling the motor.

BACKGROUND

Power tools with which heavy work can be carried out, for example on construction sites, are known from the prior art. Examples are core drilling devices or grinders or cutting devices. In these devices, usually a tool, such as a drill bit or a wheel-like grinding or cutting tool, is driven by means of a motor. In the process, the motor can generate heat which can be dissipated from the region of the motor of the power tool by cooling devices. Known from the prior art are, for example, fan wheels, but these are usually arranged on the shaft of the motor of the power tool. In other words, there is a rigid, mechanical connection between the fan wheel and the motor shaft or the motor. This rigid, mechanical connection has the result that the fan wheel and motor rotate substantially as quickly as one another, i.e. with the same rotational speed.

SUMMARY OF THE INVENTION

As a consequence of the rigid mounting of the fan wheel, the air flow that is able to be generated by the fan wheel to cool the motor of the power tool ("cooling air flow") cannot be set independently of the rotational speed of the motor. In conventional power tools, as are known from the prior art, the cooling air flow increases with the rotational speed of the unit made up of the fan wheel and motor shaft. The resulting fan losses even rise by the power of three in relation to the rotational speed of this unit. This rise is disadvantageously inversely proportional to a requirement of the motor for cooling or cooling air. It has been found that this undesired separation between the rotational speed of the motor and the available cooling performance provided by the cooling air flow can be amplified when use is made of brushless drives. This amplification is observed in particular in brushless motors with a high rotational-speed range, i.e. in those brushless motors in which the minimum and maximum rotational speeds of the drive motor differ considerably from one another.

In order to overcome the undesired separation of the rotational speed of the motor and the cooling performance or the high cooling performance losses, the prior art has proposed using ventilation units with separate motors in order for it to be possible to set the cooling performance independently of the rotational speed of the motor. However, such ventilation units are often very extensive and heavy and cause the power tools to be bulky and unwieldy, and this can be perceived as challenging specifically during the long working times on the site.

An object underlying the present invention is therefore to overcome the above-described drawbacks of the prior art and to provide a power tool in which the cooling performance can be set independently of the rotational speed of the motor of the power tool, without it being necessary to use a ventilation unit with a separate motor. The aim of the invention is, in particular, to provide compact and handy power tools in which, furthermore, fan losses, in particular at high rotational speeds of the motor, can be considerably lowered.

According to the invention, a power tool having a motor and a motor shaft is provided, wherein a fan wheel in the power tool is designed to generate an air flow for cooling the motor. The power tool is characterized in that a coupling is formed magnetically between the fan wheel and the motor shaft such that the motor shaft drives the fan wheel in a rotary movement with a speed that is less than a speed of the motor shaft. It has been found that mutual dependence of the rotational speeds can be reduced substantially by the provision of the magnetic coupling. As a result, a higher speed of the motor shaft does not specifically also result in a higher speed of the fan wheel. Although, the motor shaft is designed to drive the fan wheel, i.e. to bring about a rotary movement of the fan wheel, even when the magnetic coupling is provided, the motor shaft and the fan wheel do not move at the same rotational speed on account of the magnetic coupling, according to the invention, of the components, but rather the speed of the fan wheel is always less than the speed of the motor shaft. Therefore, for the purposes of the invention, this is preferably also referred to as decoupling of the speeds of the motor shaft and fan wheel.

In a further aspect, the invention relates to a cooling unit for a motor of a power tool, wherein the cooling unit comprises a motor shaft and a fan wheel for generating an air flow for cooling the motor of the power tool. In the cooling unit, a coupling is formed magnetically between the fan wheel and the motor shaft such that mutual dependence of the rotational speed of the fan wheel and of the motor shaft can be considerably reduced.

For the purposes of the invention, it is preferred that the fan wheel is arranged on the motor shaft. An essential advantage of the present invention is that there is no rigid, mechanical connection between the motor shaft and the fan wheel, but rather a magnetic coupling. As a result of the provision of a magnetic coupling between the fan wheel and motor shaft, the common movement at an identical speed of the fan wheel and motor shaft, which is known from the prior art and which can result in the motor not being supplied sufficiently with cooling air, can be avoided. Instead, the movements of the fan wheel and of the motor shaft are decoupled from one another such that a quantity of fed air for cooling the motor of the power tool can be regulated or set better. On account of the magnetic coupling between the fan wheel and motor shaft, the decoupling of the movements takes place preferably at high rotational speeds of the motor.

For the purposes of the invention, it is preferred that the speed of the movements of the fan wheel and of the motor shaft are specified using the rotational speed n of the respective component. As a result of the magnetic coupling between the fan wheel and motor shaft, it is thus advantageously possible for the rotational speed of the fan wheel no longer to rise to the same degree as the rotational speed of the motor shaft or of the motor. As a result, it is advantageously possible for the losses of cooling performance which rise by the power of three with respect to the rotational speed to be effectively avoided. Furthermore, improved cooling of the motor can be provided with a better adapted cooling air flow. The cooling air flow can in particular also be used to cool the power electronics of the power tool. For the purposes of the invention, it is preferred that the fan wheel of the power tool is designed to generate a cooling air flow with which the motor and/or the power electronics of the power tool can be cooled.

An essential further advantage of the invention is that, with the invention, a reduced-cost cooling solution can be specified for a power tool which is also characterized by a small space requirement. In this way, particularly compact power tools can be provided. In particular, the inventors have recognized that the fan losses, known in conventional power tools, with increasing rotational speed of the motor can be considerably reduced by replacing the rigid connection with a magnetic coupling between the fan wheel and motor shaft. As a result, an improvement in the overall efficiency of the motor or of the power tool can advantageously also be achieved.

The fan wheel preferably has a substantially circular area. On the top side of the fan wheel, guide elements for guiding and for transporting the air flow for cooling the motor of the power tool can be arranged. Furthermore, the fan wheel can have a central opening which preferably likewise has a substantially circular area. The opening is arranged preferably centrally in the fan wheel. The opening can be designed to receive the motor shaft. In other words, the motor shaft can extend through the opening in the fan wheel, wherein, according to the present invention, there is not a rigid, mechanical connection between the motor shaft and the fan wheel, but rather a magnetic coupling.

For the purposes of the invention, it is preferred that the fan wheel comprises magnetic regions for creating the magnetic coupling between the fan wheel and the motor shaft. For the purposes of the invention, it is particularly preferred that the magnetic regions are permanent magnetic regions. For example, a number of permanent magnets can be integrated in the fan wheel.

The integration of the permanent magnets into the fan wheel can be effected for example in that the permanent magnets are molded into the material of the fan wheel during production. This configuration is particularly advantageous when the fan wheel is formed from plastic or comprises plastic. The permanent magnets can advantageously form the magnetic regions that are provided to create the magnetic coupling between the fan wheel and the motor shaft. For example, in the context of the present invention, 2 to 20, preferably 4 to 14, more preferably 6 to 10 and most preferably 8 permanent magnets can be used or be provided integrated in the fan wheel.

For the purposes of the invention, it is very particularly preferred that the fan wheel has a sprocket, wherein the sprocket comprises magnetic regions for creating the magnetic coupling between the fan wheel and the motor shaft. Therefore, for the purposes of the invention, the sprocket of the fan wheel is preferably also referred to as "magnetic sprocket". The sprocket has teeth, which can preferably be arranged uniformly around a central region of the sprocket. For the purposes of the invention, the sprocket of the fan wheel is preferably also referred to as first sprocket.

For the purposes of the invention, it is preferred that the motor shaft also has a sprocket, which, for the purposes of the invention, is preferably also referred to as second sprocket. This second sprocket also represents a magnetic sprocket for the purposes of the invention. This means in particular that it has magnetic regions. The second sprocket of the motor shaft rotates preferably at the same speed, i.e. preferably with the same rotational speed n, as the motor of the power tool. For the purposes of the invention, it is very particularly preferred that the fan wheel has a first sprocket and the motor shaft has a second sprocket, wherein the magnetic coupling between the motor shaft and fan wheel is brought about by the magnetic sprockets. In other words, the sprockets of the fan wheel and motor shaft are designed to create the magnetic coupling between the motor shaft and fan wheel.

For the purposes of the invention, it is preferred that the permanent magnets or the magnetic regions are arranged so as to be preferably uniformly distributed in an outer region of the fan wheel or of the sprockets. Between the permanent magnets or between the magnetic regions, there are preferably non-magnetic regions. In other words, the magnetic regions or the permanent magnets can be separated from one another by non-magnetic regions. The permanent magnets or the magnetic regions can each have a substantially rectangular or trapezoidal area. In this case, an internal side of the preferably rectangular or trapezoidal basic shape can be shorter than an external side of the basic shape of the permanent magnets or of the magnetic regions. The internal sides of the permanent magnets or of the magnetic regions preferably face the motor shaft. For the purposes of the invention, it is preferred that the magnetic regions or the permanent magnets are arranged in a base plate of the fan wheel. However, it may also be preferred that the magnetic regions or the permanent magnets are arranged in or coincide with the guide elements of the fan wheel.

For the purposes of the invention, it is preferred that the magnetic regions or the permanent magnets have been introduced into the fan wheel so as to be oriented with respect to one another such that in each case a north pole and a south pole of the permanent magnet or of the magnetic regions are opposite one another. Preferably, the poles of the magnetic regions or of the permanent magnets are present in the circumferential direction of the fan wheel, i.e. around an imaginary concentric ring that can be provided in an outer region of the fan wheel. Tests have shown that, as a result of the integration of the permanent magnets in the fan wheel, particularly good robustness with respect to dust arises.

For the purposes of the invention, it is preferred that a number of the teeth of the second sprocket corresponds to the number of the magnetic regions or the number of the permanent magnets of the first sprocket or of the fan wheel. This preferably means, for the purposes of the invention, that the second sprocket can have for example 2 to 20, preferably 4 to 14, more preferably 6 to 10 and most preferably 8 teeth. The provision of the magnetic regions in the sprocket can be achieved for example in that permanent magnets or ferromagnetic inclusions are incorporated in the teeth of the sprocket. This may be advantageous particularly when the sprocket is made from plastic. As a result of the use of plastic, particularly lightweight sprockets can be provided. For the purposes of the invention, it may also be preferred that the sprocket is formed from a permanent-magnetic material or comprises a permanent-magnetic material. For example, ferromagnetic iron can be used as the material and basic material for the production of the sprocket. It has been found that sprockets made of iron can be produced particularly easily as simple punched parts. Alternatively, sprockets made of iron can be pressed directly and thus installed easily.

The arrangement or orientation of the magnetic regions or of the permanent magnets in the second sprocket corresponds preferably to the arrangement or orientation of the magnetic regions or of the permanent magnets within the fan wheel or within the first sprocket of the fan wheel. This preferably means, for the purposes of the invention, that the magnetic regions or the permanent magnets of the second sprocket are arranged in an outer region of the sprocket, wherein this outer region is formed preferably by the teeth of the sprocket. The magnetic regions or the permanent magnets are preferably arranged or oriented with respect to one another such that in each case a north pole and a south pole are opposite one another. In other words, the north pole of a first tooth and the south pole of a second tooth of the sprocket can be arranged opposite one another. For the purposes of the invention, it is preferred that the teeth of the sprocket form yoke-like magnetic bridges to the permanent magnets or the magnetic regions in the fan wheel or the sprocket thereof. The sprockets can be exposed or be molded for example in plastic. The sprockets with their magnetic regions, which are present in particular in the teeth of the sprocket, can, for the purposes of the invention, preferably be referred to as a permanent-magnetic or ferromagnetic perforated mask. For the purposes of the invention, it is preferred that the sprockets of the fan wheel and of the motor shaft represent magnet coupling rings with which the magnetic coupling between the fan wheel and the motor shaft can be produced. The magnetic coupling comes about in particular through the interaction of the magnetic regions of the sprockets of the fan wheel and motor shaft.

For the purposes of the invention, it is preferred that the fan wheel has a first sprocket as first magnetic coupling ring and the motor shaft has a second sprocket as second magnetic coupling ring, wherein the magnetic coupling takes place between the sprockets of the components "fan wheel" and "motor shaft". For the purposes of the invention, it is preferred that the first sprocket and the second sprocket are formed so as to correspond to one another in magnetic terms. This preferably means, for the purposes of the invention, that the sprockets are formed similarly or identically to one another with regard to the distribution of magnetic and non-magnetic regions. For the purposes of the invention, it is very particularly preferred that the sprockets are in the form of magnetic perforated masks.

In a second configuration, the power tool comprises an electromagnet, which brings about the magnetic coupling between the fan wheel and motor shaft. In this case, the electromagnet can have a basic body and a coil for generating a magnetic field. The basic body can comprise in particular a ferromagnetic material. This preferably means, for the purposes of the invention, that the basic body can be formed from a ferromagnetic material, for example iron. For the purposes of the invention, it may also be preferred that the basic body at least partially comprises a ferromagnetic material such as iron. Preferably, the basic body comprises a first region, which is surrounded by the coil, and a second region, which has an opening in which a first sprocket of the fan wheel and a second sprocket of the motor shaft are arranged so as to be rotatable with respect to one another.

For the purposes of the invention, it is preferred that a mutual dependence of the movements of the sprockets of the fan wheel and motor shaft can be substantially reduced by the invention, in particular the magnetic coupling, compared with a rigid connection between the fan wheel and motor shaft. This preferably means, for the purposes of the invention, that a coupling between the movements of the fan wheel and of the motor shaft is much less pronounced as a result of the magnetic coupling between the two components than in the case of a rigid connection as is known from conventional power tools. The sprocket of the motor shaft moves preferably at the rotational speed or speed of the motor of the power tool. As a result of the magnetic coupling between the two sprockets, it is advantageously possible for the movement of the sprocket of the fan wheel and thus preferably also the movement of the fan wheel to be decoupled from the movement of the motor shaft. As a result, the dependence of the movement of the fan wheel on the movement of the motor shaft can be considerably reduced and an increase in the rotational speed of the fan wheel at higher rotational speeds of the motor, this being associated with increased fan losses, can be effectively avoided.

For the purposes of the invention, it is preferred that a current can be applied to the coil in order to generate a magnetic field. The magnetic field can be transmitted from the preferably ferromagnetic basic body into the region of the sprockets of the fan wheel and motor shaft and thus bring about the magnetic coupling between the sprockets.

Tests have shown that the configuration of the invention with an electromagnet is associated with the advantage that the cooling air flow can be controlled and set by an electronic system of the power tool. The cooling air flow can advantageously be regulated in particular as required. For example, in the context of the present invention, the temperature of the motor of the power tool and/or the temperature of the electronic system can be determined and used as the basis for regulating or setting the cooling air flow. Furthermore, an ambient temperature of the power tool can be taken into consideration in order to set an appropriate cooling air flow for the motor of the power tool. The settability of the cooling air flow represents a major advantage of the configuration of the invention in which an electromagnet is used in order to produce a magnetic coupling between the fan wheel and motor shaft.

For the purposes of the invention, it is preferred that the magnetic field that is generated by the electromagnet can be switched on and off in a substantially binary manner. This can preferably be achieved in that the current that flows through the coil of the electromagnet is switched on or off. For the purposes of the invention, it is very particularly preferred that this current can be regulated, i.e. set to any values between 0 and 100%. As a result, it is advantageously also possible for the strength of the magnetic field generated to be set. The strength of the magnetic field generated preferably influences the strength of the magnetic coupling between the fan wheel and motor shaft, such that, through the setting of the current or of the magnetic field, the strength of this magnetic coupling can advantageously also be set. Tests have shown that the strength of the magnetic coupling determines how much the motor shaft drives the fan wheel. In other words, the strength of the magnetic coupling can determine the degree of dependence between the rotational speeds of the fan wheel and motor shaft. A strong magnetic field advantageously results in strong magnetic coupling between the fan wheel and motor shaft. As a result, the fan wheel is entrained more strongly by the motor shaft and a rotational speed of the fan wheel is only slightly less than the rotational speed of the motor shaft. A weak magnetic field advantageously results in weak magnetic coupling between the fan wheel and motor shaft. As a result, the fan wheel is entrained less strongly by the motor shaft and a rotational speed of the fan wheel is much less than the rotational speed of the motor shaft.

By way of the invention, it is possible in particular for the power tool to be cooled in particular only when this is required. As a result, the use of the fan wheel can be considerably reduced, this being advantageous especially in regions of the world with an inhomogeneous or failure-prone energy or power supply and considerably simplifying operation of the power tool.

In a second aspect, the invention relates to a method for cooling a motor of a power tool, wherein there is a magnetic coupling between a fan wheel and a motor shaft of the power tool. The magnetic coupling can preferably result in decoupling of the movements of the fan wheel and motor shaft from one another, this preferably meaning, for the purposes of the invention, that the fan wheel is "entrained" less strongly by the movement of the motor shaft than when there is a rigid connection between the components "fan wheel"

and "motor shaft". This has the result, in particular, that the fan wheel does not participate in a rapid increase in the speed of the motor, but rather that the rotational speed and/or speed of the fan wheel can remain at lower rotational speeds in spite of the high rotational speeds of the motor and motor shaft. The terms, definitions and technical advantages introduced for the power tool apply preferably in an analogous manner to the cooling method.

Further advantages will become apparent from the following description of the figures. The figures, the description and the claims contain numerous features in combination. A person skilled in the art will expediently also consider the features individually and combine them to form useful further combinations.

BRIEF DESCRIPTION OF THE DRAWINGS

Identical and similar components are denoted by the same reference signs in the figures, in which.

DETAILED DESCRIPTION

Figure 1:
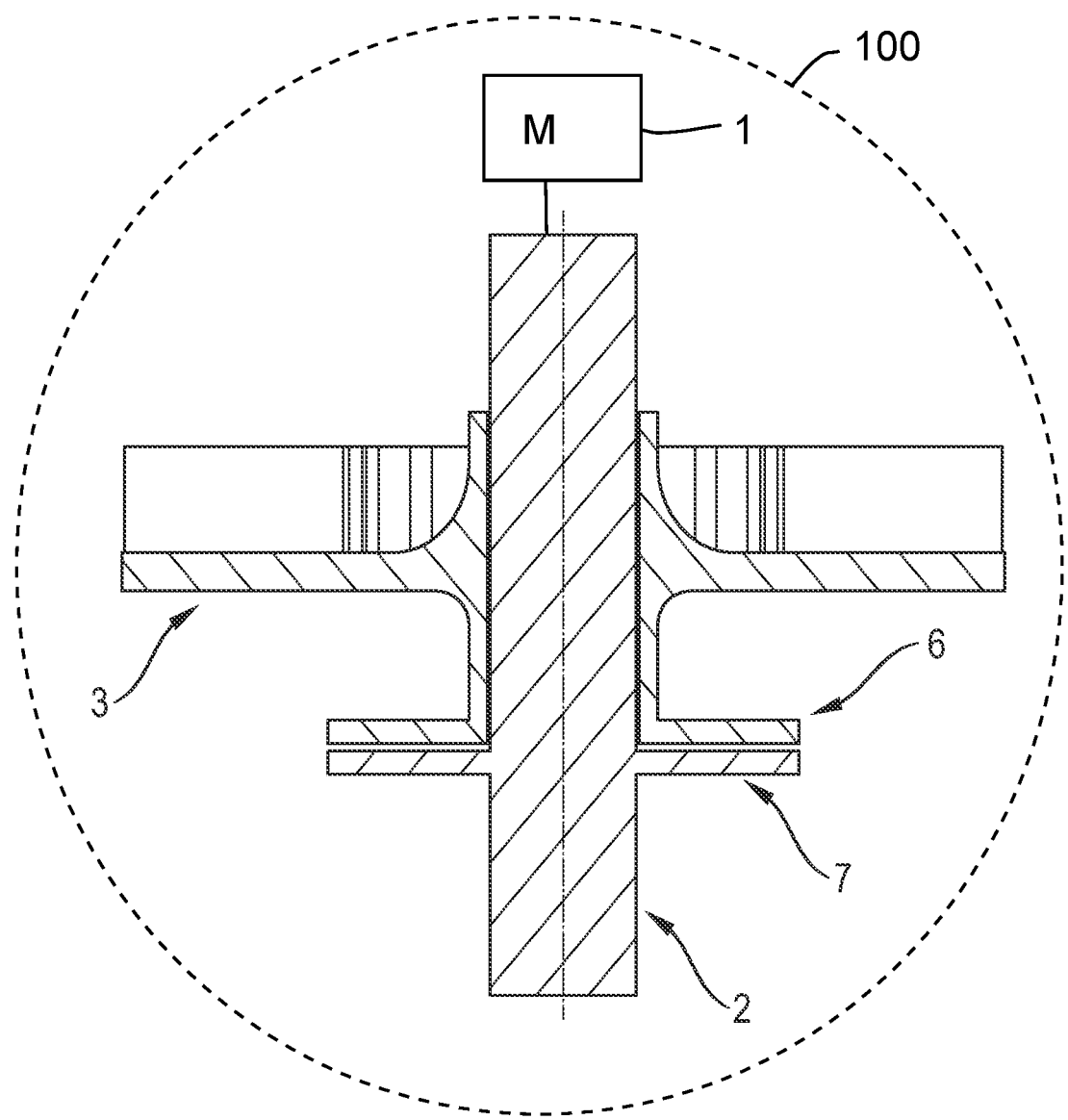
FIG. 1 shows a side view of a cooling unit with a motor shaft and fan wheel

FIG. 1 shows a side view of a motor shaft 2 and of a fan wheel 3, which together form a cooling unit for a power tool (100, shown schematically). The motor shaft 2 is connected to the motor 1 (illustrated solely schematically) and, during operation of the power tool, rotates preferably at the same speed, i.e. rotational speed, as the motor 1 itself. Between the fan wheel 3 and the motor shaft 2 there is a magnetic coupling, which, according to a first configuration of the invention (FIGS. 1 to 3), can be generated by magnetic regions 4 or permanent magnets 5. According to a second configuration of the invention (FIG. 4), the magnetic coupling can be brought about by an electromagnet 8. In this configuration of the invention, the cooling unit also comprises the electromagnet 8, which is provided to generate the magnetic coupling between the fan wheel 3 and motor shaft 2.

The magnetic regions 4 or the permanent magnets 5 can be arranged for example in the fan wheel 3. However, for the purposes of the invention, it may also be preferred that the magnetic regions 4 or the permanent magnets 5 are arranged in a sprocket 6, wherein the sprocket 6 is connected to the fan wheel 3. For the purposes of the invention, it is very particularly preferred that the fan wheel 3 has a first sprocket 6, wherein the first sprocket 6 comprises magnetic regions 4 and/or permanent magnets 5, which can bring about the magnetic coupling with the motor shaft 2. The motor shaft 2 can also comprise a sprocket 7, which is referred to as second sprocket 7 for the purposes of the invention. It is preferred, for the purposes of the invention, that the second sprocket 7 of the motor shaft 2 is configured so as to correspond magnetically to the first sprocket 6 of the fan wheel 3. This preferably means, for the purposes of the invention, that the arrangement of the magnetic regions 4 or of the permanent magnets 5 on the second sprocket 7 is similar or identical to the arrangement of the magnetic regions 4 or of the permanent magnets 5 on the first sprocket 6. The sprockets 6, 7, or their magnetic regions 4 and/or their permanent magnets 5, interact with one another such that a movement of the motor shaft 2 is transmitted to the fan wheel 3. The inventors have recognized that, as a result of the provision of a magnetic coupling between the fan wheel 3 and the motor shaft 2, a direct transmission of the movement between the components 2, 3 can be prevented. Instead, a movement of the motor shaft 2 with high rotational speeds is converted preferably into a movement of the fan wheel 3 with a lower rotational speed. As a result, losses of cooling performance, as can occur in the case of a rigid connection between the fan wheel 3 and motor shaft 2, can be considerably reduced.

Figure 2:
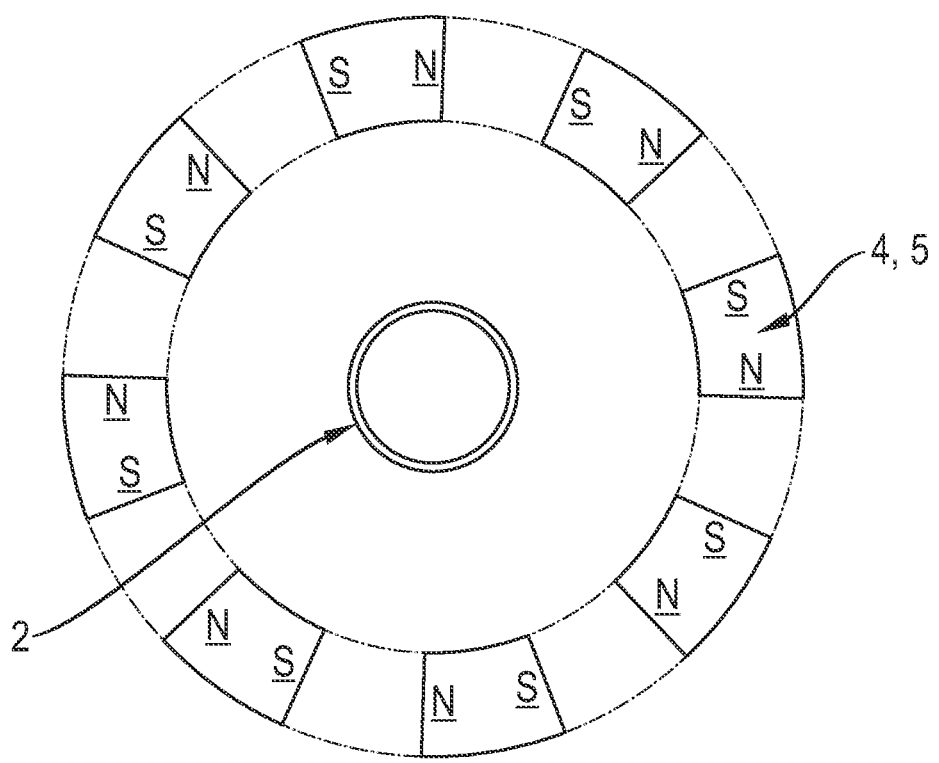
FIG. 2 shows a view of a possible arrangement of magnetic regions

FIG. 2 shows a possible arrangement of magnetic regions 4 on the fan wheel 3 or on the first sprocket 6 of the fan wheel. The magnetic regions 4 can be formed by small permanent magnets 5, which can be introduced for example into the material of the fan wheel 3 or of the first sprocket 6. The magnetic regions 4 or the permanent magnets 5 can be arranged in an outer region of the fan wheel 3 or of its first sprocket 6, wherein in each case a south pole and a north pole of two permanent magnets 5 are arranged opposite one another. In other words, the magnetic regions 4 or the permanent magnets 5 are arranged with respect to one another such that in each case a north pole and a south pole are oriented toward one another.

Figure 3:
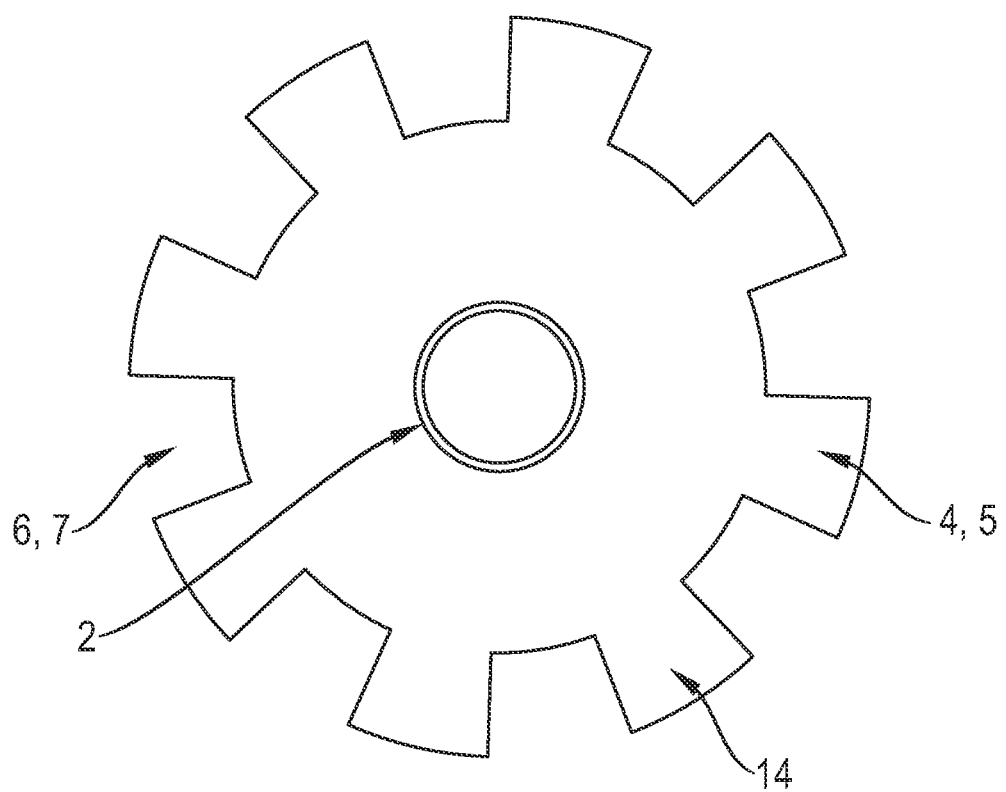
FIG. 3 shows a view of a possible configuration of a sprocket

FIG. 3 shows a possible configuration of a sprocket 6, 7. The sprocket can be either the first sprocket 6 of the fan wheel 3 or the second sprocket 7 of the motor shaft 2. The sprockets 6, 7 have teeth 14, wherein in particular the teeth 14 of the second sprocket 7 form preferably yoke-like magnetic bridges to the permanent magnets 5 or the magnetic regions 4 in the fan wheel 3 or its sprocket 6.

Figure 4:
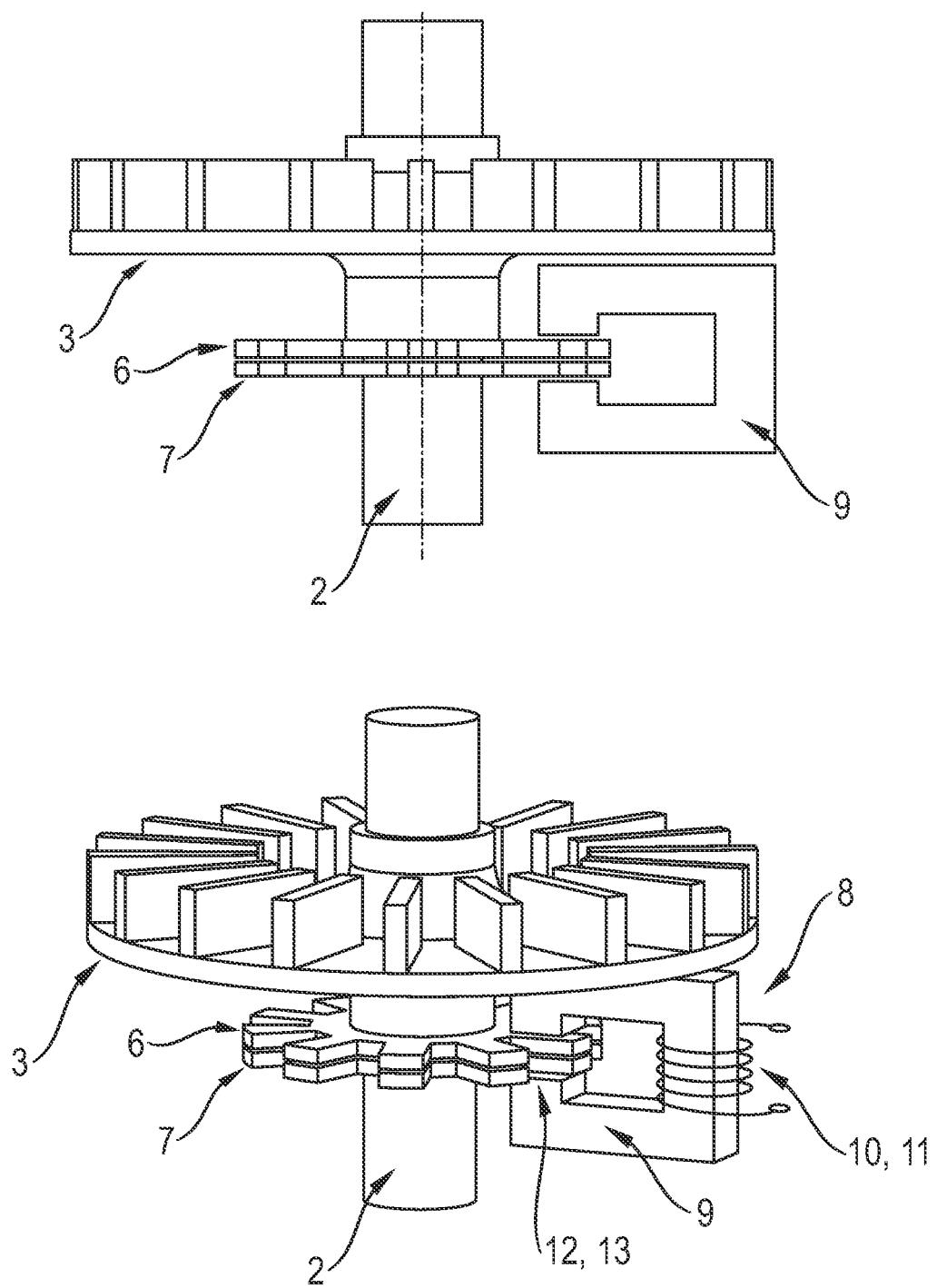
FIG. 4 shows a side view of a cooling unit with a motor shaft, fan wheel and electromagnet

FIG. 4 shows a second configuration of the invention, in which the magnetic coupling is created by means of an electromagnet 8. In particular, FIG. 4 shows a cooling unit with an electromagnet 8. The electromagnet 8 comprises a basic body 9 and a coil 10, wherein the coil 10 is designed to generate a magnetic field. The coil 10 is preferably wound around a first region 11 of the basic body, while a second region 12 of the basic body 9 has an opening 13 in which the sprockets 6, 7 of the fan wheel 3 and of the motor shaft 2 can be arranged. In particular, FIG. 4 shows a motor shaft 2 with a fan wheel 3 and electromagnet 8.

For the purposes of the invention, it is preferred that a coupling between the fan wheel 3 and the motor shaft 2 is formed magnetically such that a dependence of the movement of the fan wheel 3 on the movement of the motor shaft 2 can be considerably reduced. In a second configuration of the invention, the cooling unit comprises an electromagnet 8, which can bring about the magnetic coupling between the fan wheel 3 and motor shaft 2. To this end, the electromagnet 8 comprises a basic body 9 and a coil 10 for generating a magnetic field, wherein the basic body 9 can comprise a ferromagnetic material. The basic body 9 has a first region 11, which is surrounded by the coil 10, and a second region 12, which has an opening 13 in which a first sprocket 6 of the fan wheel 3 and a second sprocket 7 of the motor shaft 2 are arranged so as to be rotatable with respect to one another.

LIST OF REFERENCE SIGNS

1 Motor
2 Motor shaft
3 Fan wheel
4 Magnetic regions
5 Permanent magnets

6 First sprocket of the fan wheel
7 Second sprocket of the motor shaft
8 Electromagnet
9 Basic body
10 Coil
11 First region of the basic body
12 Second region of the basic body
13 Opening in the basic body
14 Teeth of the sprockets
100 Power tool

What is claimed is:

1. A power tool comprising:
a motor;
a motor shaft;
a fan wheel in the power tool to generate an air flow for cooling the motor; and
a magnetic coupling between the fan wheel and the motor shaft such that the motor shaft drives the fan wheel in a rotary movement with a speed less than a speed of the motor shaft,
the fan wheel having a first sprocket including magnetic regions for creating the magnetic coupling between the fan wheel and the motor shaft,
the motor shaft having a second sprocket, the second sprocket being magnetic in a manner corresponding to the first sprocket of the fan wheel,
the first and second sprockets being directly adjacent to each other.

2. The power tool as recited in claim 1 wherein a plurality of permanent magnets are integrated in the fan wheel.

3. The power tool as recited in claim 1 further comprising an electromagnet bringing about the magnetic coupling between the fan wheel and motor shaft.

4. The power tool as recited in claim 1 wherein the electromagnet has a basic body and a coil.

5. The power tool as recited in claim 4 wherein the basic body includes a ferromagnetic material.

6. The power tool as recited in claim 4 wherein the basic body has a first region surrounded by the coil, and a second region having an opening, the first sprocket of the fan wheel and the second sprocket of the fan wheel of the motor shaft being arranged in the opening so as to be rotatable with respect to one another.

7. A method for cooling the motor of the power tool as recited in claim 1 comprising magnetically coupling the fan wheel and the motor shaft of the power tool.

8. The power tool as recited in claim 1 wherein the second sprocket has a plurality of teeth.

9. The power tool as recited in claim 1 wherein the second sprocket has a plurality of teeth.

10. The power tool as recited in claim 9 wherein a number of the teeth is from 6 to 10.

11. The power tool as recited in claim 9 wherein a number of the teeth is eight.

12. The power tool as recited in claim 9 wherein the second sprocket has permanent magnets arranged on the teeth.

13. A cooling unit for a motor of a power tool, the cooling unit comprising:
a motor shaft;
a fan wheel for generating an air flow for cooling the motor of the power tool;
a magnetic coupling between the fan wheel and the motor shaft such that the motor shaft drives the fan wheel in a rotary movement with a speed that is less than a speed of the motor shaft; and
an electromagnet bringing about the magnetic coupling between the fan wheel and motor shaft,
the electromagnet having a basic body and a coil,
the basic body having a first region surrounded by the coil, and a second region having an opening, a first sprocket of the fan wheel and a second sprocket of the motor shaft being arranged in the opening so as to be rotatable with respect to one another.

14. The cooling unit as recited in claim 13 wherein the basic-body includes a ferromagnetic material.

15. A power tool comprising:
a motor;
a motor shaft;
a fan wheel in the power tool to generate an air flow for cooling the motor; and
a magnetic coupling between the fan wheel and the motor shaft such that the motor shaft drives the fan wheel in a rotary movement with a speed less than a speed of the motor shaft,
the electromagnet having a basic body and a coil,
the basic-body having a first region surrounded by the coil, and a second region having an opening, a first sprocket of the fan wheel and a second sprocket of the motor shaft being arranged in the opening so as to be rotatable with respect to one another.

* * * * *